United States Patent
Yamaguchi

(10) Patent No.: US 12,519,871 B2
(45) Date of Patent: Jan. 6, 2026

(54) COMMUNICATION SYSTEM

(71) Applicant: SUBARU CORPORATION, Tokyo (JP)

(72) Inventor: Fumihito Yamaguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 97 days.

(21) Appl. No.: 18/034,770

(22) PCT Filed: Nov. 4, 2021

(86) PCT No.: PCT/JP2021/040684
§ 371 (c)(1),
(2) Date: May 1, 2023

(87) PCT Pub. No.: WO2023/079664
PCT Pub. Date: May 11, 2023

(65) Prior Publication Data
US 2024/0348706 A1    Oct. 17, 2024

(51) Int. Cl.
*H04L 69/18* (2022.01)
*H04W 64/00* (2009.01)

(52) U.S. Cl.
CPC .......... *H04L 69/18* (2013.01); *H04W 64/006* (2013.01)

(58) Field of Classification Search
CPC ..... H04L 69/18; H04L 69/161; H04L 67/025; H04L 67/125; H04W 64/006
See application file for complete search history.

(56) References Cited

U.S. PATENT DOCUMENTS

| | | | |
|---|---|---|---|
| 2019/0349426 A1* | 11/2019 | Smith | H04L 9/3239 |
| 2020/0045124 A1 | 2/2020 | Wayama et al. | |
| 2023/0040980 A1* | 2/2023 | Kamasaka | B66B 1/468 |

FOREIGN PATENT DOCUMENTS

JP    2020-21252 A    2/2020

* cited by examiner

*Primary Examiner* — Joon H Hwang
(74) *Attorney, Agent, or Firm* — TROUTMAN PEPPER LOCKE LLP

(57) ABSTRACT

Provided is a communication system in which transmission and reception of information is performed between a server and a communication apparatus mounted on a vehicle or a client terminal owned by an occupant of the vehicle via a base station. A client terminal includes a first communication module and a second communication module. A server includes a third communication module and a fourth communication module. The first communication module transmits position information of a vehicle to the third communication module in accordance with HTTP as a communication protocol. The fourth communication module transmits driving control information specific to the vehicle and surrounding environment information specific to the vehicle that are generated to the second communication module in accordance with MQTT as a communication protocol, with a MQTT topic assigned with an ID and with a delivery guarantee function added depending on the degree of importance of the information.

5 Claims, 4 Drawing Sheets

[ FIG. 1 ]
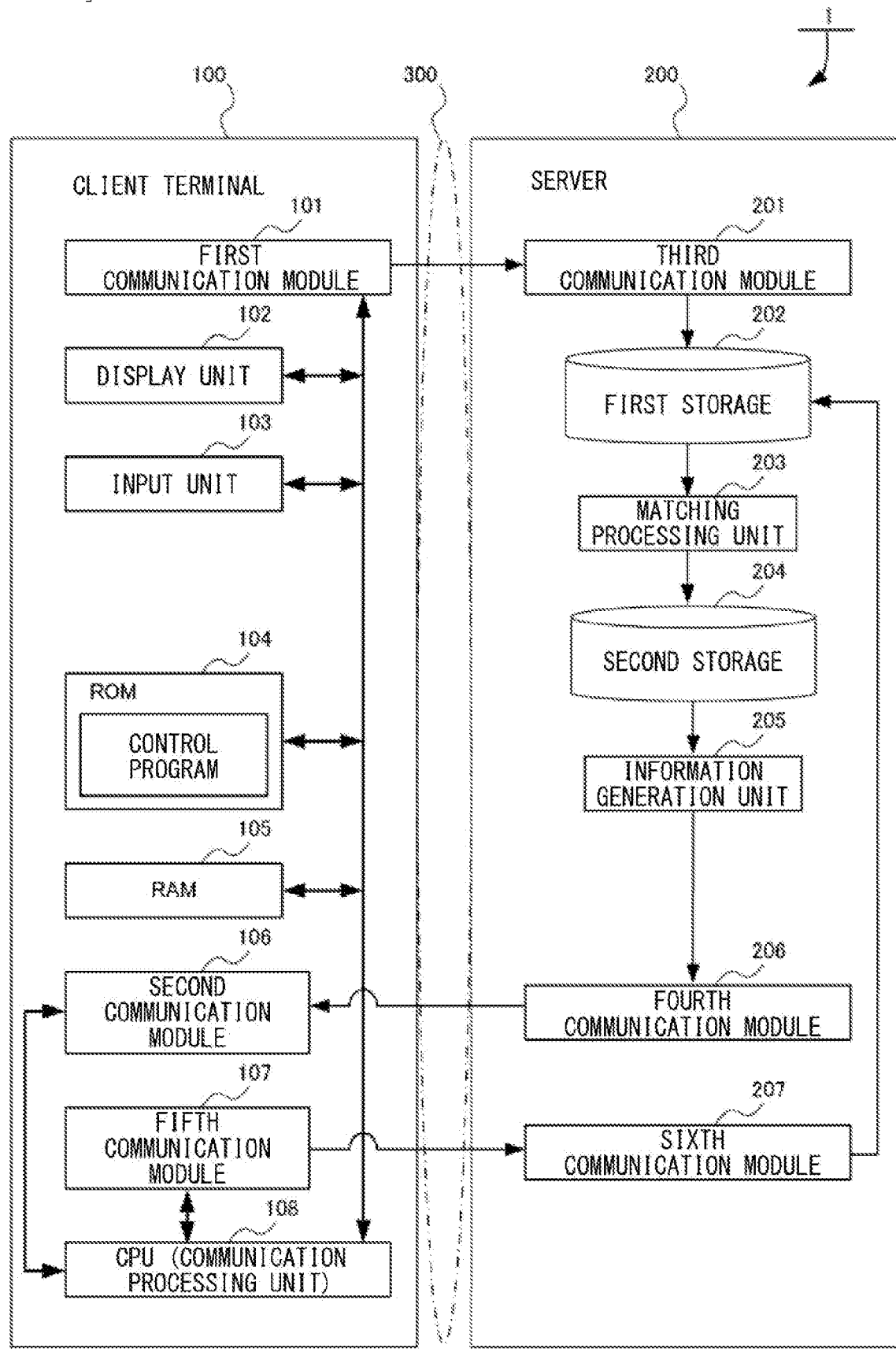

[FIG. 2]
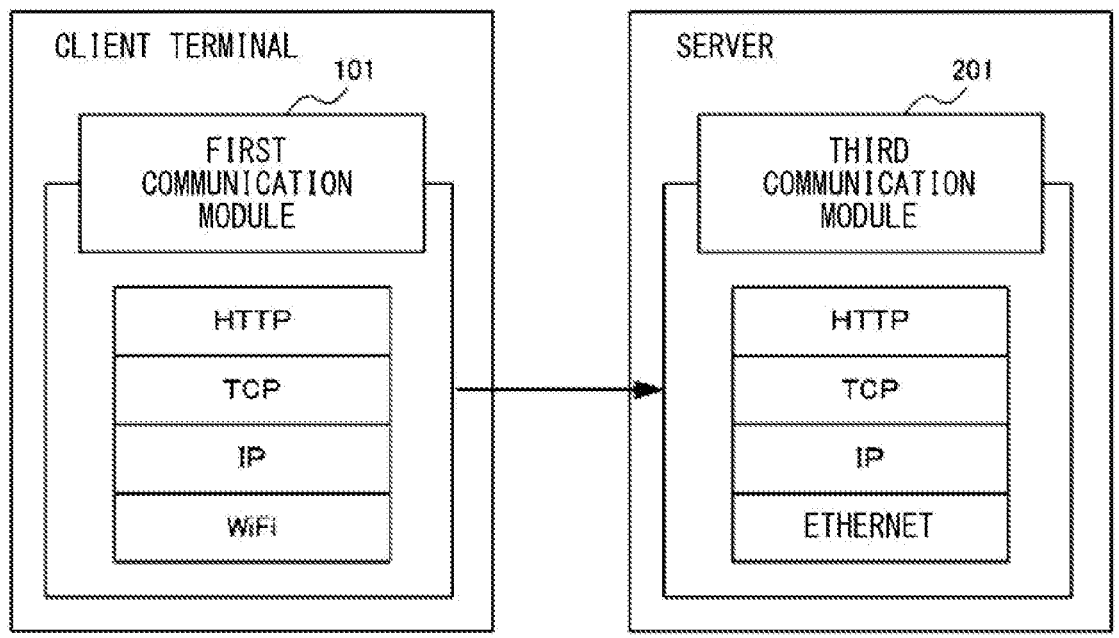
[FIG. 3]
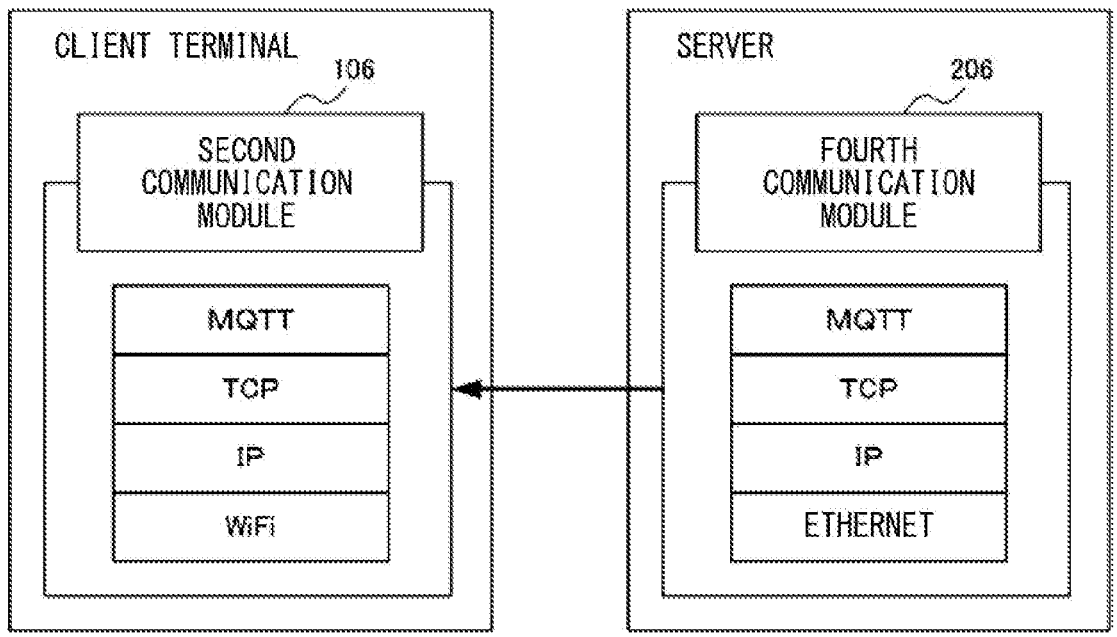

[ FIG. 4 ]
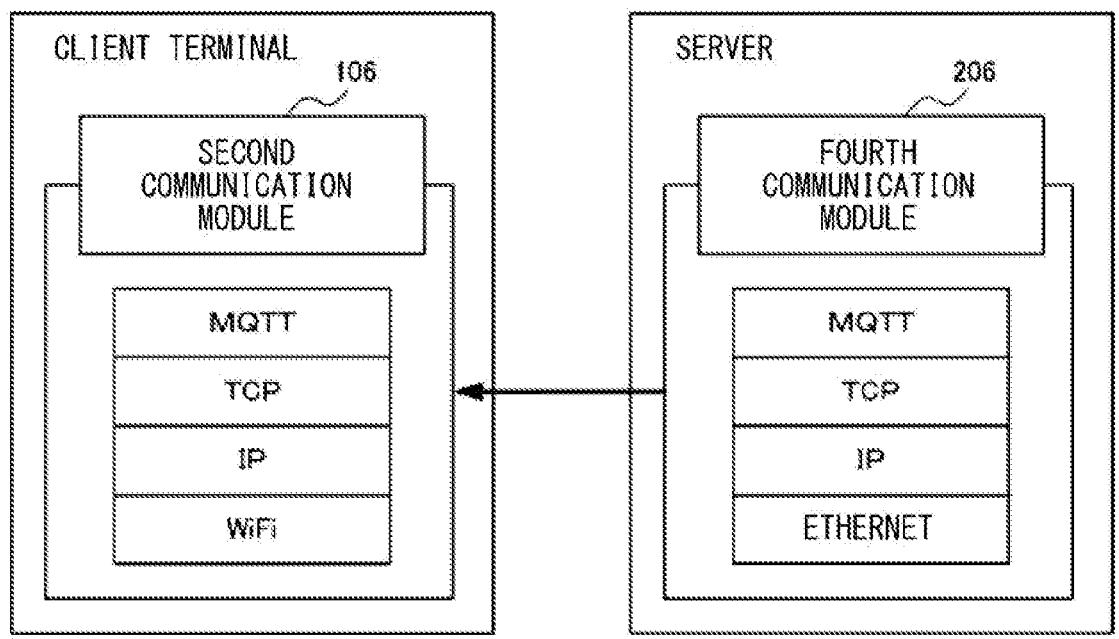
[ FIG. 5 ]
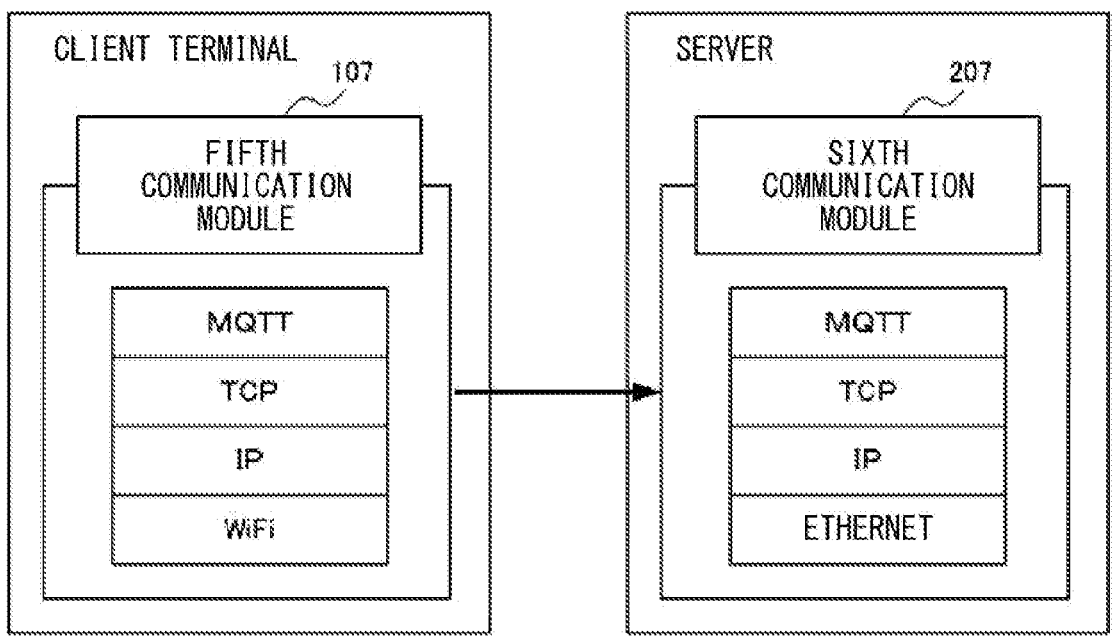

[ FIG. 6 ]
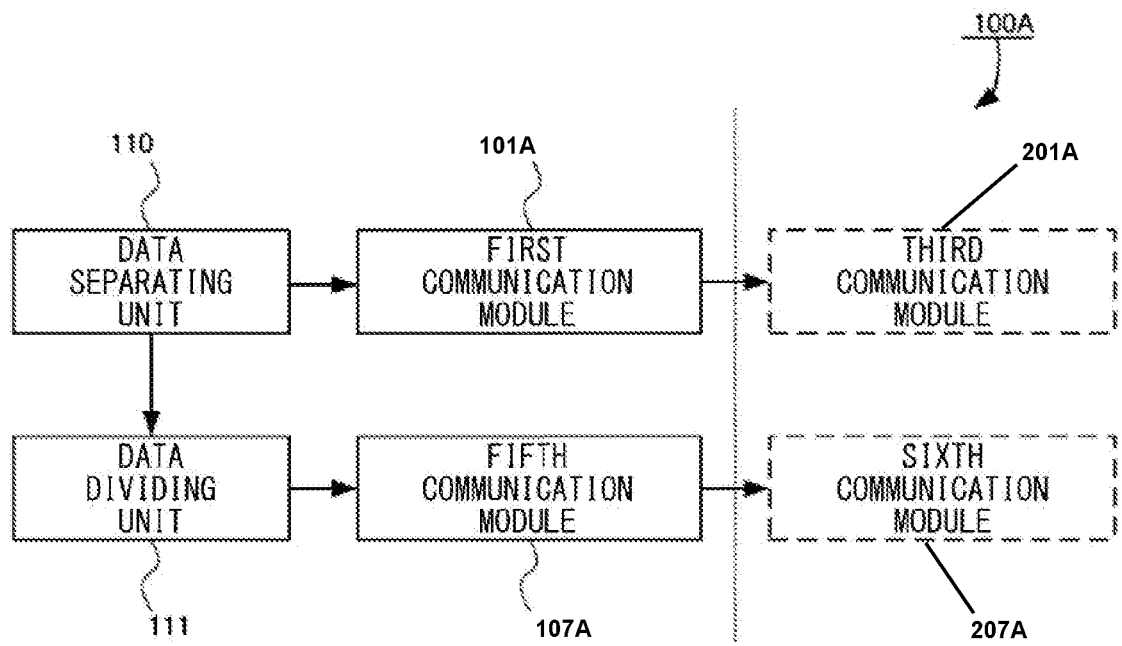
[ FIG. 7 ]
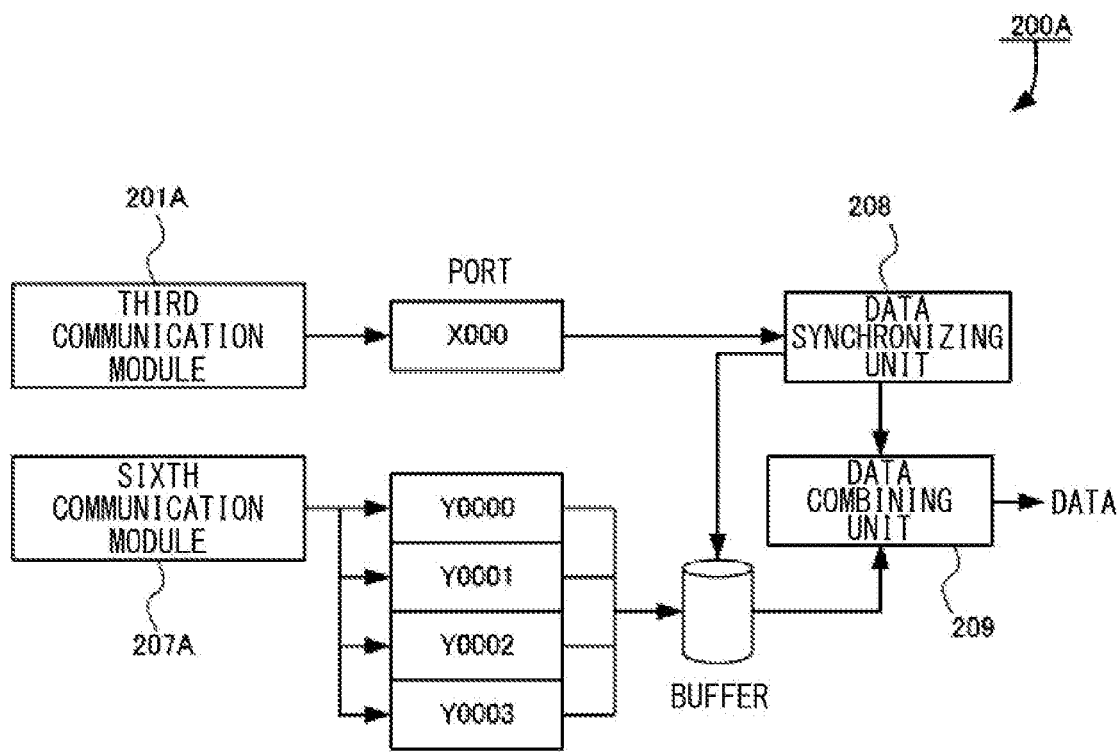

COMMUNICATION SYSTEM

CROSS-REFERENCE TO RELATED APPLICATION

This application is the U.S. National Phase under 35 U.S.C. § 371 of International Application No. PCT/JP2021/040684, filed on Nov. 4, 2021. The contents of this application are incorporated by reference in its entirety.

TECHNICAL FIELD

The invention relates to a communication system.

BACKGROUND

The number of services provided via a network such as the Internet has been increasingly on the rise in recent years. The number of terminals connectable to a network has also seen a large increase accordingly.

Meanwhile, a vehicle connectable to a network, a so-called connected car, has been developed in the field of automobiles. In this field as well, urgent support following this trend is expected to be made in the future.

To address the above-described issue, Japanese Unexamined Patent Application Publication No. 2020-21252, for example, discloses a technique relating to a relay apparatus that relays communication between a server which provides service and a terminal which receives the service in order to achieve a flexible operation of a system using communication. The relay apparatus includes a first communication apparatus and a second communication circuit. The first communication apparatus transmits a signal to the terminal in accordance with a first communication protocol. The second communication circuit receives a signal from the terminal in accordance with a second communication protocol that is different from the first communication protocol, and communicates with the server.

SUMMARY OF INVENTION

However, the technique disclosed in Japanese Unexamined Patent Application Publication No. 2020-21252 is characterized by including the relay apparatus to achieve a flexible operation of the system using communication. The technique disclosed in Japanese Unexamined Patent Application Publication No. 2020-21252 is thus incompatible with a communication system for a connected car configured without taking into consideration the provision of a relay apparatus.

Further, achieving a request or a response in communication between an automatic driving vehicle and a cloud server using a simple configuration such as a general HTTP server has the following issues.

One issue is that, although the communication between the automatic driving vehicle and the cloud server requires high connection continuity even in a poor communication environment, existing techniques can affect automatic driving application service and fail to secure safety due to problems with reconnection (e.g., a retry time or interruption of connection).

Another issue is that the HTTP, which is a synchronous protocol that establishes a locked state in which no operation is permitted until a response is received, has an elongated communication latency time and thus makes it difficult to improve connection scalability in the case of connection with multiple clients.

Still another issue is that the HTTP, which involves a larger data size and a larger number of sequences than MQTT, takes higher communication costs than the MQTT.

The invention has been made in view of the above-described issues, and an object of the invention is to provide a communication system that secures safety operation and rapid transmission and reception of information while contributing to a cost reduction by selecting a server communication protocol suitable for various applications of a communication system for automatic driving.

Aspect 1: One or more embodiments of the invention proposes a communication system in which transmission and reception of information is performed between a server and a communication apparatus mounted on a vehicle or a client terminal owned by an occupant of the vehicle via a base station. The communication apparatus or the client terminal includes a first communication module configured to transmit position information of the vehicle to the server, a second communication module configured to receive information including driving control information specific to the vehicle and surrounding environment information specific to the vehicle from the server, and a communication data processing unit configured to conduct communication data processing on communication modules including the first communication module and the second communication module. The server includes a third communication module configured to receive the position information of the vehicle from the first communication module, a first storage configured to store the position information of the vehicle received by the third communication module, a matching processing unit configured to conduct matching processing on the position information of the vehicle stored in the first storage, a second storage configured to store a result of the matching processing conducted by the matching processing unit, an information generation unit configured to generate the information including the driving control information specific to the vehicle and the surrounding environment information specific to the vehicle based on the result of the matching processing conducted by the matching processing unit, and a fourth communication module configured to transmit the information generated by the information generation unit to the second communication module. The first communication module is configured to transmit the position information of the vehicle in accordance with HTTP as a communication protocol. The fourth communication module is configured to transmit the driving control information specific to the vehicle and the surrounding environment information specific to the vehicle that are generated by the information generation unit to the second communication module in accordance with MQTT as a communication protocol, with a MQTT topic assigned with an ID and with a delivery guarantee function added depending on the degree of importance of the information.

Aspect 2: One or more embodiment of the invention proposes the communication system characterized by the following. The information generation unit is configured to generate traffic information, information including surrounding topics, and information regarding the server that are obtained at a time of a MQTT connection with the base station. The fourth communication module is configured to transmit the traffic information, the information including the surrounding topics, and the information regarding the server that are generated by the information generation unit to the second communication module in accordance with the MQTT as a communication protocol, with a MQTT topic made common and no delivery guarantee function added.

Aspect 3: One or more embodiments of the invention proposes the communication system characterized by the following. The communication apparatus or the client terminal includes a fifth communication module configured to transmit emergency information to the server. The server includes a sixth communication module configured to receive the emergency information from the fifth communication module. The fifth communication module is configured to transmits the emergency information to the sixth communication module in accordance with the MQTT as a communication protocol, with a MQTT topic assigned with an ID and a delivery guarantee function added.

Aspect 4: One or more embodiments of the invention proposes the communication system characterized by the following. The communication apparatus or the client terminal includes a fifth communication module configured to transmit emergency information to the server. The server includes a sixth communication module configured to receive the emergency information from the firth communication module. When information to be transmitted from the communication apparatus or the client terminal to the server is large data, the first communication module is configured to transmit data information to the third communication module in accordance with the HTTP as a communication protocol, the fifth communication module is configured to transmit multiple pieces of divided data obtained as a result of division of the large data to the sixth communication module in accordance with TCP as a communication protocol, and the sixth communication module is configured to receive the received pieces of divided data via respective ports corresponding to the respective pieces of divided data and combines the pieces of divided data received via the respective ports in synchronization with the data information received by the third communication module.

According to one or more embodiments of the invention, an effect is provided that it is possible to secure safety operation and rapid transmission and reception of information while contributing to a cost reduction by selecting a server communication protocol suitable for various applications of a communication system for automatic driving.

BRIEF DESCRIPTION OF DRAWINGS

FIG. 1 is a diagram illustrating a configuration of a communication system according to a first embodiment of the invention.

FIG. 2 is a diagram schematically illustrating a protocol stack of the communication system according to the first embodiment of the invention.

FIG. 3 is a diagram schematically illustrating a protocol stack of the communication system according to the first embodiment of the invention.

FIG. 4 is a diagram schematically illustrating a protocol stack of the communication system according to the first embodiment of the invention.

FIG. 5 is a diagram schematically illustrating a protocol stack of the communication system according to the first embodiment of the invention.

FIG. 6 is a diagram illustrating a configuration of a client terminal in a communication system according to a second embodiment of the invention.

FIG. 7 is a diagram illustrating a configuration of a sever in the communication system according to the second embodiment of the invention.

DETAILED DESCRIPTION

In the following, some embodiments of the invention are described with reference to FIGS. 1 to 7.

A communication system 1 according to a first embodiment is described with reference to FIGS. 1 to 5.

As illustrated in FIG. 1, the communication system 1 according to the first embodiment includes a client terminal 100 and a server 200.

The client terminal 100 is a portable terminal owned by an occupant of a vehicle. In the first embodiment, a description is made by exemplifying the client terminal 100 as a portable terminal owned by an occupant of a vehicle; however, the client terminal 100 may be a dedicated communication apparatus mounted on the vehicle, for example.

The client terminal 100 transmits, for example, own-vehicle position information, own-vehicle surrounding image information, emergency information, and other information items to the server 200 via an internet network, and receives, for example, surrounding environment information, vehicle control information, server information, and other information items from the server 200.

The server 200 is a server provided in a cloud, for example.

The server 200 receives, for example, the own-vehicle position information, the own-vehicle surrounding image information, the emergency information, and other information items from the client terminal 100 via the internet network, and transmits, for example, the surrounding environment information, the vehicle control information, the server information, and other information items to the client terminal 100.

As illustrated in FIG. 1, the client terminal 100 includes a first communication module 101, a display unit 102, an input unit 103, a read only memory (ROM) 104, a random access memory (RAM) 105, a second communication module 106, a fifth communication module 107, and a communication processing unit (CPU) 108.

The first communication module 101 is one of functional units to establish communication between the client terminal 100 and an external device (e.g., the server 200 in the first embodiment).

The first communication module 101 transmits the own-vehicle position information to the server 200 in accordance with HTTP as a communication protocol.

The display unit 102 is a lamp that performs information indication using a light emission pattern or a display that performs information displaying on a screen, for example. The display unit 102 indicates input result information inputted to the client terminal 100 by a user or information regarding execution results of various processes, for example.

The display unit 102 may include a speaker or a vibrator that makes various information outputs including audible outputs such as sounds or voices and vibration outputs in addition to or in place of the visual outputs.

The input unit 103 includes, for example, a keyboard, a pointing device (a mouse), or a touch pad. The input unit 103 receives a user operation and incorporates a command indicating the user operation into the client terminal 100.

The input unit 103 may have any configuration as long as the reception of a user operation or a user instruction is enabled. For example, the input unit 103 may be a microphone that acquires a user instruction in the form of a sound, a camera that images a user's motion and receives a user instruction on the basis of the motion, or a sensor that detects a vibration of the client terminal 100.

Alternatively, the display unit 102 and the input unit 103 may be implemented as a single functional block by use of a touch panel, for example.

The ROM 104 is a non-volatile memory and stores program codes to be executed by the client terminal 100, for example. The program codes include a control program.

Herein, the control program is, for example, a program for overall control of the client terminal 100 (the first communication module 101, the display unit 102, the input unit 103, the ROM 104, the RAM 105, the second communication module 106, and the fifth communication module 107). For example, the CPU 108 executes the control program to thereby control operations of the first communication module 101, the second communication module 106, and the fifth communication module 107. Under the control, the first communication module 101, the second communication module 106, and the fifth communication module 107 perform a process of transmitting and receiving signals.

The RAM 105 is a volatile memory and temporarily stores information.

The second communication module 106 is one of the functional units to establish communication between the client terminal 100 and an external device (e.g., the server 200 in the first embodiment).

The second communication module 106 receives driving information including control information specific to the own vehicle and surrounding environment information specific to the own vehicle from the server 200.

The fifth communication module 107 is one of the functional units to establish communication between the client terminal 100 and an external device (e.g., the serve 200 in the first embodiment).

The fifth communication module 107 transmits emergency information to the server 200 in accordance with the MQTT as a communication protocol.

The CPU 108 performs various kinds of control including overall control of the client terminal 100.

For example, the CPU 108 reads a control program from the ROM 104, loads the read control program into the RAM 105, and performs various kinds of control using the RAM 105 as a workspace.

The CPU 108, the ROM 104, and the RAM 105 are examples of a processor and memories, and another configuration including another processor and other memories may be employed.

Alternatively, for example, at least some of the processes may be performed by an application specific integrated circuit (ASIC) or dedicated hardware, such as a field programmable gate array (FPGA), set in advance to perform predetermined processing.

Note that, in the first embodiment, all the components are coupled to each other with a communication bus.

As illustrated in FIG. 1, the server 200 includes a third communication module 201, a first storage 202, a matching processing unit 203, a second storage 204, an information generation unit 205, a fourth communication module 206, and a sixth communication module 207.

Although the server 200 includes a ROM, a RAM, a CPU, and other components as well, a detailed description thereof is omitted.

Herein, a network 300 is, for example, any of the Internet, an intranet, a LAN, a WAN, a phone line, a dedicated digital line, an ATM, a frame relay line, a cable television line, and a wireless line for data broadcasting, or a combination thereof. Note that these are mere examples and other networks may be used.

Further, the network 300 may be a wired network or a wireless network. For example, some sections of the network 300 may be configured by a wired network, and the other sections of the network 300 may be configured by a wireless network.

The third communication module 201 receives the own-vehicle position information from the first communication module of the client terminal 100. The own-vehicle position information received by the third communication module 201 is stored in the first storage 202.

The first storage 202 stores the own-vehicle position information received by the third communication module 201 and another information item in correlation with each other in a database format.

The matching processing unit 203 is one of functions of a non-illustrated CPU. The matching processing unit 203 reads the own-vehicle position information stored in the first storage 202 to execute matching processing, and store the results of the process in the second storage 204.

The second storage 204 stores the results of the process performed by the matching processing unit 203 and another information item in correlation with each other in a database format.

The information generation unit 205 reads the results of the process performed by the matching processing unit 203 from the second storage 204 to generate the information including the driving control information specific to the own vehicle and the surrounding environment information specific to the own vehicle, and outputs the generated information to the fourth communication module 206.

The fourth communication module 206 transmits the driving control information specific to the own vehicle and the surrounding environment information specific to the own vehicle that are generated by the information generation unit 205 to the second communication module 106 of the client terminal 100 in accordance with the MQTT as a communication protocol.

The fourth communication module 206 transmits traffic information, information including surrounding topics, and information regarding the server that are generated by the information generation unit 205 to the second communication module 106 in accordance with the MQTT as a communication protocol, with a MQTT topic made common and no delivery guarantee function added.

The sixth communication module 207 receives the emergency information from the fifth communication module 107 of the client terminal 100.

The emergency information received by the sixth communication module 207 is stored in the first storage 202.

Protocol stacks of the communication modules in each communication are described with reference to FIGS. 2 to 5.

The protocol stacks illustrated in FIGS. 2 to 5 each include, in order from the bottom layer, a network interface layer, an internet layer, a transport layer, and an application layer as defined by the internet protocol suite.

As illustrated in FIG. 2, in a case where the first communication module 101 of the client terminal 100 transmits the own-vehicle position information to the third communication module 201 of the server 200, the first communication module 101 has a protocol stack including "HTTP" as the application layer, "TCP" as the transport layer, "IP" as the internet layer, and "WiFi (registered trademark)" as the network interface layer.

In contrast, the third communication module 201 has a protocol stack including "HTTP" as the application layer, "TCP" as the transport layer, "IP" as the internet layer, and "Ethernet (registered trademark)" as the network interface layer.

As illustrated in FIG. 3, in a case where the fourth communication module 206 of the server 200 transmits the information including the driving control information specific to the own vehicle and the surrounding environment information specific to the own vehicle that are generated by the information generation unit 205 to the second communication module 106 of the client terminal 100, the second communication module 106 has a protocol stack including "MQTT" as the application layer, "TCP" as the transport layer, "IP" as the internet layer, and "WiFi" as the network interface layer.

In contrast, the fourth communication module 206 has a protocol stack including "MQTT" as the application layer, "TCP" as the transport layer, "IP" as the internet layer, and "Ethernet" as the network interface layer.

The fourth communication module 206 transmits the information including the driving control information specific to the own vehicle and the surrounding environment information specific to the own vehicle that are generated by the information generation unit 205 to the second communication module 106, with the MQTT topic assigned with an ID or with the delivery guarantee function added depending on the degree of importance of the information.

As illustrated in FIG. 4, in a case where the fourth communication module 206 of the server 200 transmits the traffic information, the information including surrounding topics, and the information regarding the server that are generated by the information generation unit 205 to the second communication module 106 of the client terminal 100, the second communication module 106 has a protocol stack including "MQTT" as the application layer, "TCP" as the transport layer, "IP" as the internet layer, and "WiFi" as the network interface layer.

In contrast, the fourth communication module 206 has a protocol stack including "MQTT" as the application layer, "TCP" as the transport layer, "IP" as the internet layer, and "Ethernet" as the network interface layer.

The fourth communication module 206 transmits the traffic information, the information including surrounding topics, and the information regarding the server that are generated by the information generation unit 205 to the second communication module 106, with the MQTT topic made common and no delivery guarantee function added.

As illustrated in FIG. 5, in a case where the fifth communication module 107 of the client terminal 100 transmits the emergency information to the sixth communication module 207 of the server 200, the fifth communication module 107 has a protocol stack including "MQTT" as the application layer, "TCP" as the transport layer, "IP" as the internet layer, and "WiFi" as the network interface layer.

In contrast, the sixth communication module 207 has a protocol stack including "MQTT" as the application layer, "TCP" as the transport layer, "IP" as the internet layer, and "Ethernet" as the network interface layer.

The fifth communication module 107 transmits the emergency information to the sixth communication module 207, with the MQTT topic made common and the delivery guarantee function added.

As described above, in the communication system 1 according to the first embodiment, the first communication module 101 of the communication apparatus or the client terminal 100 transmits the position information of the vehicle in accordance with the HTTP as a communication protocol.

That is, as for the position information of the vehicle, the HTTP having high connection performance is used as a communication protocol.

Accordingly, it is possible to surely transmit the position information of the vehicle from the client terminal 100 to the server 200, which ensures execution of the process at the server 200 and safety operation of the vehicle.

In addition, as for the driving control information specific to the vehicle and the surrounding environment information specific to the vehicle, the MQTT is used as a communication protocol. The driving control information specific to the vehicle and the surrounding environment information specific to the vehicle that are generated by the information generation unit 205 are transmitted to the second communication module 106 of the communication apparatus or the client terminal 100 with the MQTT topic assigned with an ID and with the delivery guarantee function added depending on the degree of importance of the information.

That is, the driving control information specific to the vehicle and the surrounding environment information specific to the vehicle are transmitted in accordance with the MQTT as specific information of which MQTT topic is assigned with an ID and to which the delivery guarantee function is added depending on the degree of importance of the information.

Assigning the ID to the MQTT topic makes it possible to limit a destination, which results in a reduction in communication costs. Further, limiting the destination and adding the delivery guarantee function depending on the importance of the information make it possible to surely transmit important information to a specific destination.

Therefore, it is possible to achieve safety operation of the vehicle and rapid and ensured transmission and reception of information.

Further, in the communication system 1 according to the first embodiment, the fourth communication module 206 of the server 200 transmits the traffic information, the information including surrounding topics, and the information regarding the server that are generated by the information generation unit 205 of the server 200 to the second communication module 106 in accordance with the MQTT as a communication protocol, with the MQTT topic made common and no delivery guarantee function added.

That is, the traffic information, the information including surrounding topics, and the information regarding the server are transmitted in accordance with the MQTT as general information of which MQTT topic is made common and to which no delivery guarantee function is added.

Accordingly, the server 200 makes it possible to transmit the server information and the surrounding environment information (traffic information and surrounding topics) regardless of data reception from the client terminal 100. This results in a reduction in communication costs.

Therefore, it is possible to achieve safety operation of the vehicle and rapid and ensured transmission and reception of information.

Further, in the communication system 1 according to the first embodiment, the fifth communication module 107 transmits the emergency information to the sixth communication module 207 in accordance with the MQTT as a communication protocol, with the MQTT topic assigned with an ID and the delivery guarantee function added.

That is, the emergency information is transmitted from the client terminal 100 to the server 200 through a dedicated communication path using the MQTT, with the MQTT topic assigned with the ID and the delivery guarantee function added.

Transmitting the emergency information to the server 200 through the dedicated communication path using the MQTT makes it possible to reduce a communication traffic volume as compared with the case of using the HTTP. Further, transmitting the emergency information to the server 200 through the dedicated communication path makes it possible to advance a start time of processing at the server 200. This suppresses a reception delay of the server 200. Further, assigning an ID to the MQTT topic makes it possible to limit a destination. This results in a reduction in communication costs. Further, limiting a destination and adding the delivery guarantee function depending on the degree of importance of the information make it possible to surely transmit important information to a specific destination.

Therefore, it is possible to achieve safety operation of the vehicle and rapid and ensured transmission and reception of information.

A communication system 1A according to a second embodiment is described with reference to FIGS. 6 and 7.

As illustrated in FIGS. 1 and 6, a client terminal 100A according to the second embodiment includes a first communication module 101A, the display unit 102, the input unit 103, the ROM 104, the RAM 105, the second communication module 106, a fifth communication module 107A, a data separating unit 110, a data dividing unit 111, and the communication processing unit (CPU) 108.

Note that components denoted by the same reference numerals as those in the first embodiment have similar functions to the components in the first embodiment, and a detailed description thereof is omitted.

The data separating unit 110 separates large data into actual data and data information. Examples of the data information include time, a file name, a file size, a serial number, the number of divisions, a hash value, and a processing completion notification.

The data information obtained as a result of the separation at the data separating unit 110 is outputted to the first communication module 101, and the actual data obtained as a result of the separation is outputted to the data dividing unit 111 to be described later.

The data dividing unit 111 divides the actual data obtained as a result of the separation at the data separating unit 110 into multiple data groups.

The data groups obtained as a result of the division at the data dividing unit 111 are outputted to the fifth communication module 107A at predetermined time intervals.

The first communication module 101A transmits the data information to a third communication module 201A of the server 200 in accordance with the HTTP as a communication protocol.

The fifth communication module 107A transmits the divided data to the sixth communication module 207 in accordance with the TCP as a communication protocol.

As illustrated in FIGS. 1 and 7, a server 200A according to the second embodiment includes the third communication module 201A, the first storage 202, the matching processing unit 203, the second storage 204, the information generation unit 205, the fourth communication module 206, a sixth communication module 207A, a data synchronizing unit 208, and a data combining unit 209.

Note that components denoted by the same reference numerals as those in the first embodiment have similar functions to the components in the first embodiment, and a detailed description thereof is omitted.

The third communication module 201A receives the data information from the first communication module 101A. The data information received by the third communication module 201A is outputted to the data synchronizing unit 208 to be described later via a dedicated port ("X000" in FIG. 7).

The sixth communication module 207A receives the divided data from the fifth communication module 107A. The divided data received by the sixth communication module 207A are temporarily stored in a buffer via multiple ports ("Y0000", "Y0001", "Y0002", and "Y0003" in FIG. 7), and are thereafter outputted to the data combining unit 209 to be described later at predetermined time intervals.

The data synchronizing unit 208 outputs the data information to the data combining unit 209 in synchronization with the timings when the data combining unit 209 to be described later reads the divided data from the buffer on the basis of the data information received from the third communication module 201A and the information obtained by referring to the buffer.

The data combining unit 209 combines the multiple pieces of divided data read from the buffer and the data information received from the data synchronizing unit 208 together to thereby generate the original data.

As described above, in the communication system 1A according to the second embodiment, the data separating unit 110 of the client terminal 100 separates large data into the actual data and the data information such as time, a file name, a file size, a serial number, the number of divisions, a hash value, and a processing completion notification. The data dividing unit 111 divides the actual data obtained as a result of the separation at the data separating unit 110 into the multiple data groups. The first communication module 101A transmits the data information to the third communication module 201A of the server 200 in accordance with the HTTP as a communication protocol, and the fifth communication module 107A transmits the divided data to the sixth communication module 207 in accordance with the TCP as a communication protocol.

Meanwhile, the third communication module 201A of the server 200 receives the data information from the first communication module 101A, outputs the data information to the data synchronizing unit 208 via the dedicated port. The sixth communication module 207A receives the divided data from the fifth communication module 107A, and the divided data are temporarily stored in the buffer via the multiple ports. The data synchronizing unit 208 outputs the data information to the data combining unit 209 in synchronization with the timings when the data combining unit 209 to be described later reads the divided data from the buffer on the basis of the data information received from the third communication module 201A and the information obtained by referring to the buffer. The data combining unit 209 combines the multiple pieces of divided data read from the buffer and the data information received from the data synchronizing unit 208 together to thereby generate the original data.

That is, the TCP protocol using several ports is separately prepared as a communication line dedicated to large data, and multiple pieces of data are uploaded to the server in parallel. This secures a communication band without hindering other communication.

Further, as large data is divided before being transmitted and the divided data are combined at a reception side to restore the original data, sufficient confidentiality is secured.

Further, as large data is divided before being transmitted and the divided data are combined at the reception side to restore the original data, even if defect data is generated, the divided data group including the defect data only has to be resent upon data retransmission. This minimizes a communication delay.

In the first embodiment, for example, the first communication module 101 transmits the own-vehicle position information to the server 200 in accordance with the HTTP as a communication protocol. However, whether to use the HTTP or the MQTT as a protocol may be determined depending on whether the application gives importance to connectivity or immediate response/immediate processing, for example.

For example, the HTTP is suitable for a navigation control application in view of its characteristics.

The communication system 1 or 1A of the invention may be implemented by storing processes to be performed by the CPU 108 and other components in a storage medium readable by a computer system, and causing the CPU 108 and the other components to read and execute the program stored in the storage medium. The term "computer system" used herein encompasses an OS and hardware such as peripheral devices.

In a case where the computer system uses a world wide web (WWW) system, the term "computer system" further encompasses a webpage providing environment (or a display environment). Further, the above-described program may be transmitted from the computer system storing the program in, for example, a storage device to another computer system via a transmission medium or by means of a transmission wave of a transmission medium. Herein, the "transmission medium" that transmits the program refers to a medium having a function of transmitting information. Examples of the transmission medium include a network (communication network) such as the Internet and a communication line (communication wire) such as a phone line.

Some or all of the above-described functions may be achieved by the above-described program. Alternatively, the above-described program may be a so-called differential file (a differential program) that is achievable by combining the above-described function and the program already stored in the computer system together.

Although some embodiments of the invention are described above with reference to the drawings, specific configurations are not limited to these embodiments and include design or the like in a range without departing from the gist of the invention.

The invention claimed is:

1. A communication system in which transmission and reception of information is performed between a server and a communication apparatus mounted on a vehicle or a client terminal owned by an occupant of the vehicle via a base station, comprising:
   one or more processors; and
   one or more memories storing instructions for causing the one or more processors to,
      cause the communication apparatus or the client terminal to,
         transmit position information of the vehicle to the server,
         receive information including driving control information specific to the vehicle and surrounding environment information specific to the vehicle from the server, and
      cause the server to,
         receive the position information of the vehicle from the communication apparatus or the client terminal,
         store the received position information of the vehicle into a first storage,
         conduct matching processing on the position information of the vehicle stored in the first storage,
         store a result of the matching processing into a second storage,
         generate the information including the driving control information specific to the vehicle and the surrounding environment information specific to the vehicle based on the result of the matching processing, and
         transmit the generated information to the communication apparatus or the client terminal,
   the one or more processors are further configured to,
      cause the communication apparatus or the client terminal to transmit the position information of the vehicle in accordance with Hypertext Transfer Protocol (HTTP) as a communication protocol, and
      cause the server to transmit the generated driving control information specific to the vehicle and the surrounding environment information specific to the vehicle to the communication apparatus or the client terminal in accordance with Message Queue Telemetry Transport (MQTT) as a communication protocol, with a MQTT topic assigned with an ID and with a delivery guarantee function added depending on a degree of importance of the information.

2. The communication system according to claim 1, wherein the one or more processors are further configured to cause the server to,
   generate traffic information, information including surrounding topics, and information regarding the server that are obtained at a time of a MQTT connection with the base station, and
   transmit the generated traffic information, the information including the surrounding topics, and the information regarding the server to the communication apparatus or the client terminal in accordance with the MQTT as a communication protocol, with a MQTT topic made common and no delivery guarantee function added.

3. The communication system according to claim 1, wherein the one or more processors are further configured to,
   cause the communication apparatus or the client terminal to transmit emergency information to the server in accordance with the MOTT as a communication protocol, with the MQTT topic assigned with the ID and the delivery guarantee function added,
   cause the server to receive the emergency information from the communication apparatus or the client terminal.

4. The communication system according to claim 1, wherein the one or more processors are further configured to,
   cause the communication apparatus or the client terminal to transmit emergency information to the server,
   cause the server to receive the emergency information from the communication apparatus or the client terminal, and
   when information to be transmitted from the communication apparatus or the client terminal to the server is large data, the one or more processors are configured to,
      cause the communication apparatus or the client terminal to,
         transmit data information to the server in accordance with the HTTP as a communication protocol, and
         transmit multiple pieces of divided data obtained as a result of division of the large data to the server in accordance with Transmission Control Protocol (TCP) as a communication protocol, and
      cause the server to, output the received pieces of divided data via respective ports corresponding to the respective pieces of divided data, and combine the pieces of divided data received via the respective ports in synchronization with the received data information.

5. The communication system according to claim 4, wherein the data information comprises at least one of time, a file name, a file size, a serial number, the number of divisions, a hash value, or a processing completion notification.

* * * * *